US012186766B2

(12) United States Patent
Perkins et al.

(10) Patent No.: US 12,186,766 B2
(45) Date of Patent: Jan. 7, 2025

(54) NOZZLE AND SPRINKLER FOR CENTER PIVOT END

(71) Applicant: NELSON IRRIGATION CORPORATION, Walla Walla, WA (US)

(72) Inventors: Lee A. Perkins, Lowden, WA (US); Craig B. Nelson, Walla Walla, WA (US); Loren Vander Griend, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 181 days.

(21) Appl. No.: 17/523,550

(22) Filed: Nov. 10, 2021

(65) Prior Publication Data

US 2022/0168759 A1    Jun. 2, 2022

Related U.S. Application Data

(60) Provisional application No. 63/119,826, filed on Dec. 1, 2020.

(51) Int. Cl.
 *B05B 1/26*  (2006.01)
 *A01G 25/09* (2006.01)
 *B05B 1/20*  (2006.01)

(52) U.S. Cl.
 CPC ............ *B05B 1/267* (2013.01); *A01G 25/092* (2013.01); *B05B 1/20* (2013.01)

(58) Field of Classification Search
 CPC .......... B05B 1/20; B05B 1/267; A01G 25/092
 (Continued)

(56) References Cited

U.S. PATENT DOCUMENTS 1,756,483 A    4/1930   Estep
2,706,133 A *  4/1955   North, Jr. .............. A01M 7/006
                                                              239/588

(Continued)

FOREIGN PATENT DOCUMENTS

FR          1196348          11/1959

OTHER PUBLICATIONS

International Search Report dated Feb. 23, 2022 issued PCT International Patent Application No. PCT/US2021/058895, 5 pp.

(Continued)

*Primary Examiner* — Chee-Chong Lee
(74) *Attorney, Agent, or Firm* — NIXON & VANDERHYE P.C.

(57) ABSTRACT

A sprinkler nozzle is configured for a sprinkler positioned at a distal end of a center pivot irrigation system. The sprinkler nozzle includes a connection part securable to the sprinkler, and a nozzle opening downstream of the connection part. A nozzle opening downstream of the connection part is part-toroidal shaped and partially blocked or skewed to control water flow to portions of the deflector plate according to a desired wetted area. The part-toroidal shape spans an arc less than 360 degrees. The nozzle enables a custom designed water application to complement the other sprinklers that are on the pivot and can be shaped to also apply water a distance beyond the end of the pivot pipe to match the application rate of the sprinklers along the pivot pipe.

13 Claims, 7 Drawing Sheets

(58) Field of Classification Search
USPC .................................................. 239/222.17
See application file for complete search history.

(56) References Cited

U.S. PATENT DOCUMENTS

| | | | | |
|---|---|---|---|---|
| 2,804,338 | A | | 8/1957 | Johnston |
| 3,533,557 | A | * | 10/1970 | Ingram ................ A01G 25/092 |
| | | | | 239/734 |
| 3,567,124 | A | | 3/1971 | Jones |
| 3,669,353 | A | | 6/1972 | Hanson et al. |
| 3,735,928 | A | * | 5/1973 | Watts .................... B05B 15/658 |
| | | | | 285/305 |
| 4,676,438 | A | * | 6/1987 | Sesser .................. A01G 25/092 |
| | | | | 239/524 |
| 4,832,264 | A | | 5/1989 | Rosenberg |
| 4,842,201 | A | * | 6/1989 | Hunter .................. B05B 3/0454 |
| | | | | 239/240 |
| 5,333,796 | A | * | 8/1994 | Purtell .................... A01G 25/09 |
| | | | | 239/734 |
| 6,332,581 | B1 | | 12/2001 | Chin et al. |
| 6,382,525 | B1 | | 5/2002 | Santiesteban et al. |
| 8,297,533 | B2 | | 10/2012 | Dunn et al. |
| 8,690,076 | B2 | | 4/2014 | Yamasaki et al. |
| 9,168,541 | B2 | | 10/2015 | Hung |
| 9,227,207 | B1 | | 1/2016 | Bredberg et al. |
| 9,700,903 | B2 | | 7/2017 | Kawamori et al. |
| 10,239,066 | B2 | | 3/2019 | Sesser et al. |
| 2013/0334340 | A1 | | 12/2013 | Walker et al. |
| 2022/0048052 | A1 † | | 2/2022 | Drechsel |

OTHER PUBLICATIONS

Nelson Irrigation Corporation, The Nelson R55 End of Center Pivot Sprinker, 1 page screenshot of YouTube video, originally available on Apr. 4, 2016, available at: https://www.youtube.com/watch?v=7tPCG4szOao.†

\* cited by examiner
† cited by third party

NOZZLE AND SPRINKLER FOR CENTER PIVOT END

CROSS-REFERENCES TO RELATED APPLICATIONS

This application claims the benefit of U.S. Provisional Patent Application No. 63/119,826, filed Dec. 1, 2020, the entire content of which is herein incorporated by reference.

STATEMENT REGARDING FEDERALLY SPONSORED RESEARCH OR DEVELOPMENT (NOT APPLICABLE)

BACKGROUND

The invention relates to a nozzle and sprinkler suited for the distal end of a center pivot irrigation system and, more particularly, to a sprinkler nozzle for a sprinkler that improves irrigation efficiency at the end of the center pivot system.

Near and beyond the end of a center pivot irrigation system, it is difficult to design a sprinkler to apply the same amount of water to a crop as under the length of the pivot pipe. Typically, less water is applied near the end due to the end sprinklers having fewer sprinklers to provide overlapping water. This results in less crop growth near the edge of the field and less revenue for the grower.

It is desirable to efficiently irrigate a distance, e.g., 20-30 feet, beyond the end of the pivot to substantially increase the acreage fully irrigated by the pivot and thus increase revenue without substantial increases in cost. Existing sprinklers, however, are not configured to distribute enough water beyond the pivot pipe end, resulting in stunted crop growth near and beyond the ends of the pivot pipe.

SUMMARY

It is possible to design a rotating plate style of sprinkler using non-round nozzle openings to custom design a water application that complements the other sprinklers that are on the pivot. The sprinkler is placed on the end of the pivot pipe and distributes water back under the pivot pipe to supplement the deficit of water from the sprinklers mounted along and near the end of the pivot pipe.

The nozzle opening can be made to be substantially more than 180 degrees to help it more effectively blend with the sprinklers along the pivot. The portion of the nozzle that is blocked may be skewed relative to the pivot pipe to compensate for curvature in the distribution plate and to also more precisely feather the edge of the pattern under the pivot pipe.

The nozzle can be shaped to also apply water a distance beyond the end of the pivot in such a way as to match the application rate of the sprinklers along the pivot, thus effectively increasing the acres irrigated by the pivot.

In an exemplary embodiment, a sprinkler nozzle for a sprinkler positioned at a distal end of a center pivot irrigation system includes a connection part securable to the sprinkler, and a nozzle opening downstream of the connection part. The nozzle opening is part-toroidal shaped and partially blocked or skewed to control water flow to portions of the deflector plate according to a desired wetted area. The part-toroidal shaped opening spans an arc less than 360 degrees. The nozzle opening may include a block member that cuts across the part-toroidal shaped opening and obstructs water flow to a portion of the deflector plate. The part-toroidal shaped opening may include a part-circular perimeter, and the block member may be positioned across a segment of the part-circular perimeter. The block member may be disposed on a distal end side of the nozzle opening. The part-toroidal shaped opening may be canted relative to a longitudinal axis of the pivot pipe.

In some embodiments, the nozzle may include a plurality of block members that cut across the part-toroidal shaped opening. In this context, the part-toroidal shaped opening may include a part-circular perimeter, where the block members are positioned across segments of the part-circular perimeter. The plurality of block members may include block members positioned at 90 degrees and 270 degrees relative to a longitudinal axis of the pivot pipe.

The part-toroidal shaped opening may span an arc between 240-270 degrees.

In some embodiments, the part-toroidal shaped opening may be skewed such that the nozzle opening may be an oblong part-toroidal shape. The oblong part-toroidal shape may include a larger opening on a distal end side.

In another exemplary embodiment, a sprinkler includes a main body connectable to a source of water under pressure, the sprinkler nozzle of the described embodiments secured to the main body, and a deflector plate positioned facing the sprinkler nozzle downstream of the sprinkler nozzle.

In yet another exemplary embodiment, a center pivot irrigation system includes a center pivot, a pivot pipe rotatably coupled with the center pivot, and a plurality of sprinklers installed along a length of the pivot pipe. The sprinkler of the described embodiments is positioned adjacent a distal end of the pivot pipe.

In still another exemplary embodiment, a sprinkler nozzle for a sprinkler positioned at a distal end of a center pivot irrigation system includes a connection part securable to the sprinkler, and a nozzle opening downstream of the connection part that is part-toroidal shaped with a part-circular perimeter and includes a first block member in a form of a segment of the part-circular perimeter that cuts across the part-toroidal shaped opening and obstructs water flow to a portion of the deflector plate. The nozzle opening includes a pair of second block members in a form of angled block members that are positioned at ends of the part-toroidal shaped opening.

BRIEF DESCRIPTION OF THE DRAWINGS

These and other aspects and advantages will be described in detail with reference to the accompanying drawings, in which.

DETAILED DESCRIPTION

Figure 1:
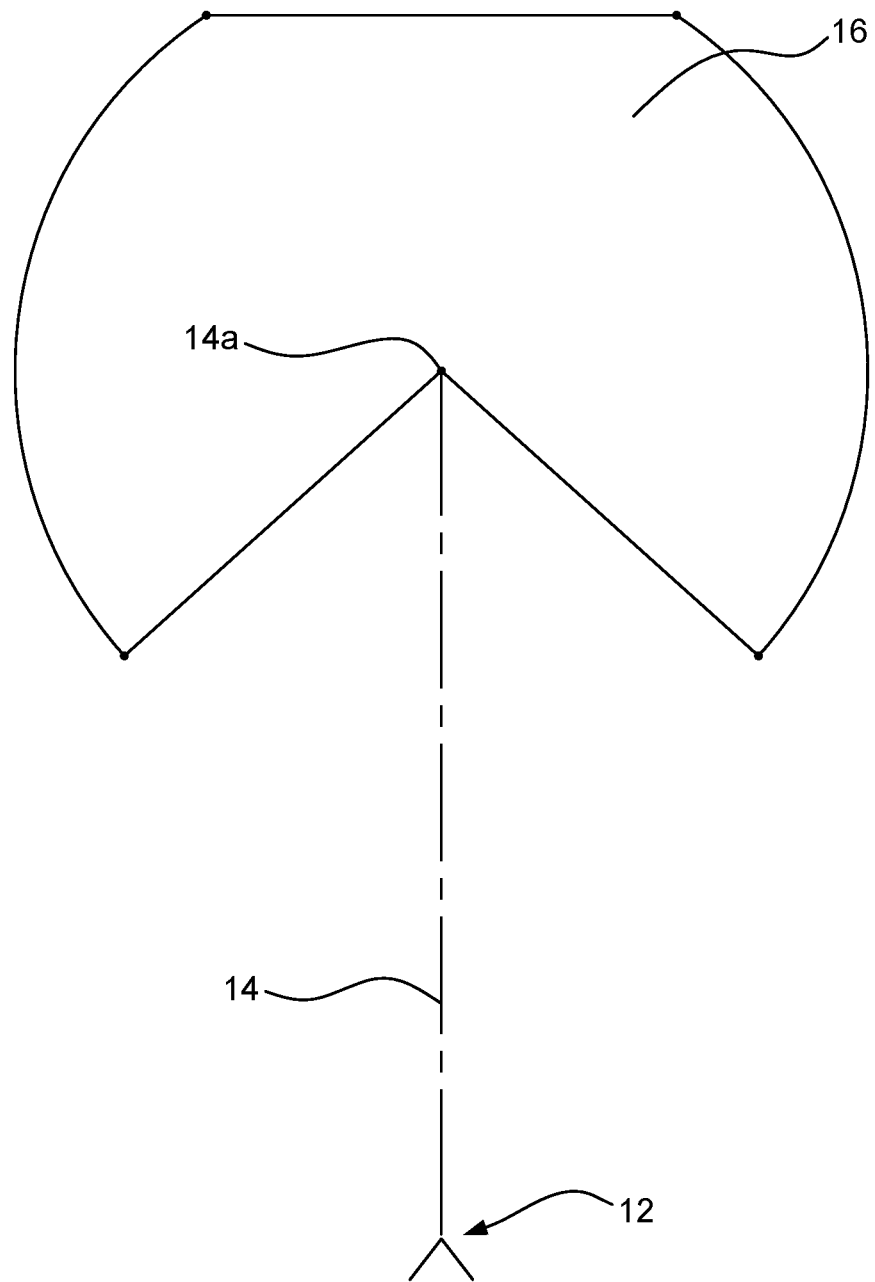
FIG. 1 is a schematic illustration of a center pivot irrigation system including a representation of the proposed sprinkler wetted area with the sprinkler and nozzle of the described embodiments.

FIG. 1 is a schematic illustration of a center pivot irrigation system. The center pivot irrigation system includes a center pivot 12 and a pivot pipe 14 rotatably coupled with the center pivot 12. The pipe 14 is supported along its length via wheeled supports (not shown). A plurality of sprinklers are connected with and secured along the length of the pivot pipe 14. The number and spacing of the sprinklers vary based on the application, sprinkler type, etc.

According to the described embodiments, a sprinkler nozzle is installed in a sprinkler at a distal end 14a of the center pivot pipe 14. The sprinkler nozzle and sprinkler are configured to produce the proposed sprinkler wetted area 16 as shown in FIG. 1.

Figure 2:
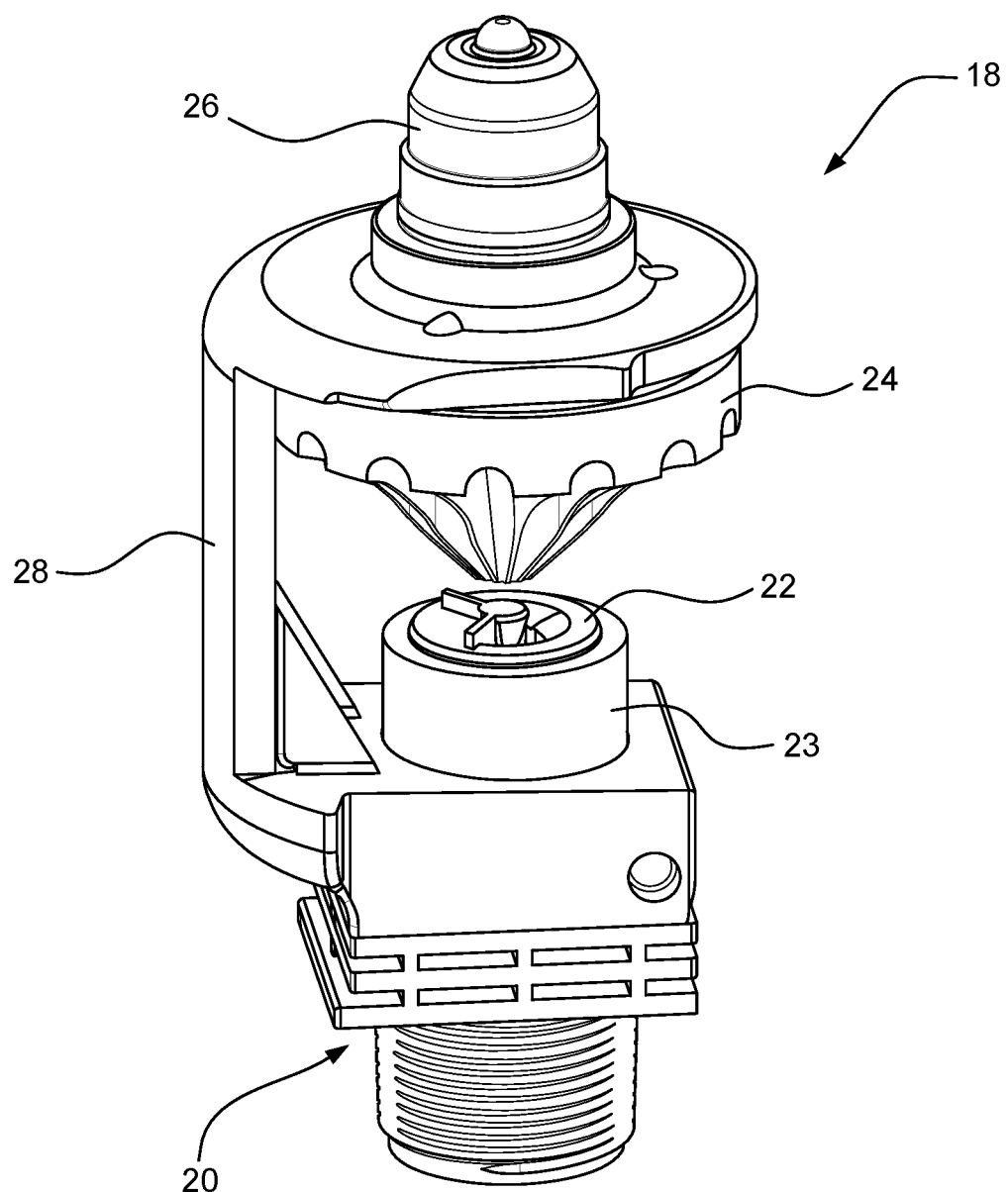
FIG. 2 shows an exemplary sprinkler incorporating an exemplary nozzle of the described embodiments.

FIG. 2 shows an exemplary sprinkler 18 connectable to the pivot pipe 14. The sprinkler 18 may be connected directly to the pivot pipe 14 or may be connected to the pivot pipe via a drop pipe or the like.

The sprinkler 18 includes a main body 20 connectable to a source of water under pressure (e.g., via the pivot pipe 14). A sprinkler nozzle 22 is mounted in the main body 20 downstream of a water inlet. The sprinkler nozzle 22 is connected to the main body 20 by pressing a connection part of the nozzle into a nozzle base 23. The nozzle 22 is held in place by the friction of the press fit. The main body 20 is threaded to allow it to connect to the water source.

A deflector plate 24 is positioned facing the sprinkler nozzle 22 downstream of the sprinkler nozzle 22. The deflector plate 24 includes grooves and lands that distribute the water according to a desired distribution pattern and that effect rotation of the deflector plate 24 when impacted by water from the nozzle 22. The exemplary sprinkler shown in FIG. 2 also includes a brake mechanism 26 for controlling a spin rate of the deflector plate 24. The deflector plate 24 and brake mechanism 26 may be connected to the main body 20 via a strut 28 or the like.

Any suitable sprinkler incorporating the nozzle 22 of the described embodiments could be utilized, and the sprinkler 18 shown in FIG. 2 is merely exemplary. The structure and function of the main body 20, the deflector plate 24, the brake mechanism 26 and the strut 28 are known, and details thereof will not be described.

Figure 3A:
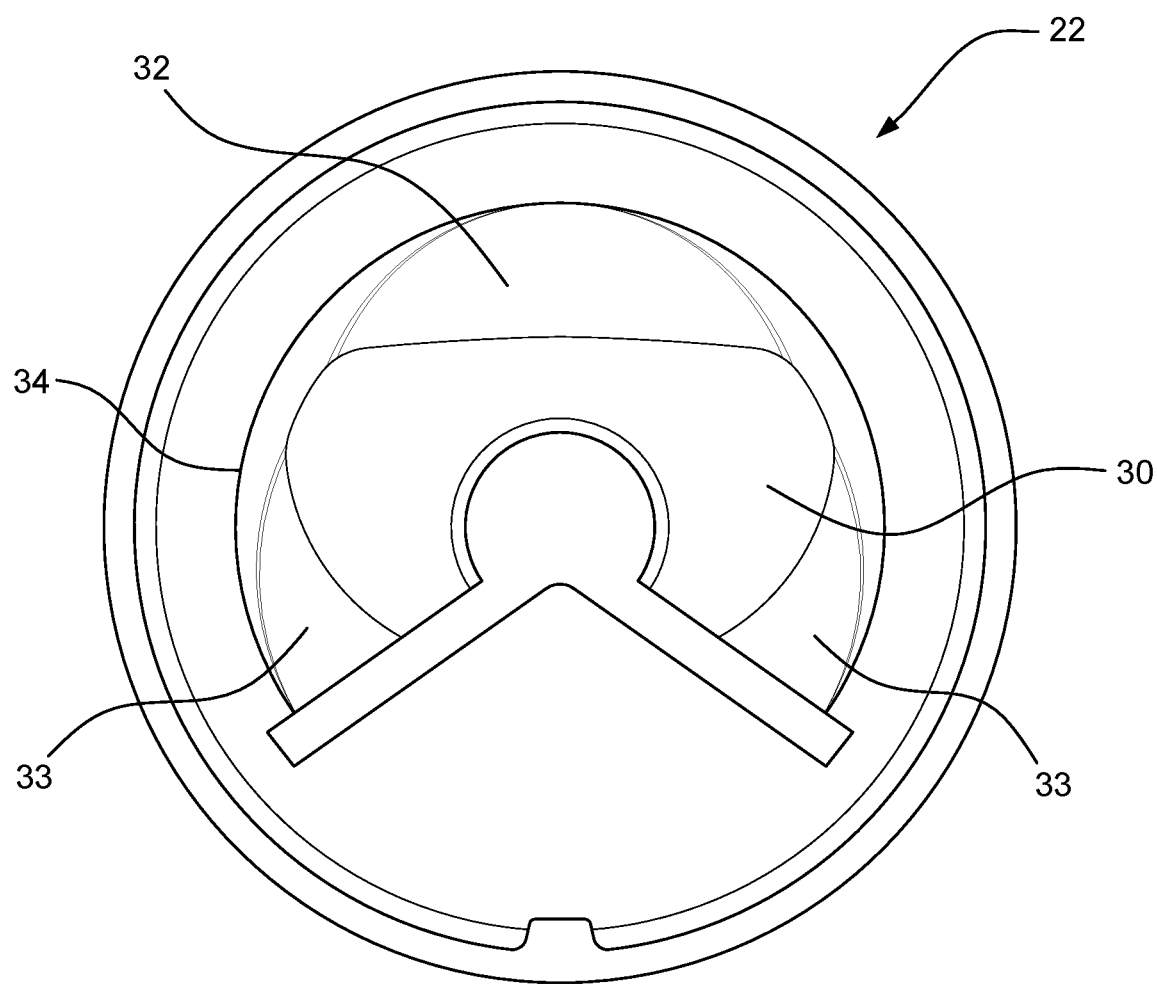
FIG. 3A is a plan view of the exemplary nozzle shown in FIG. 2.
Figure 3B:
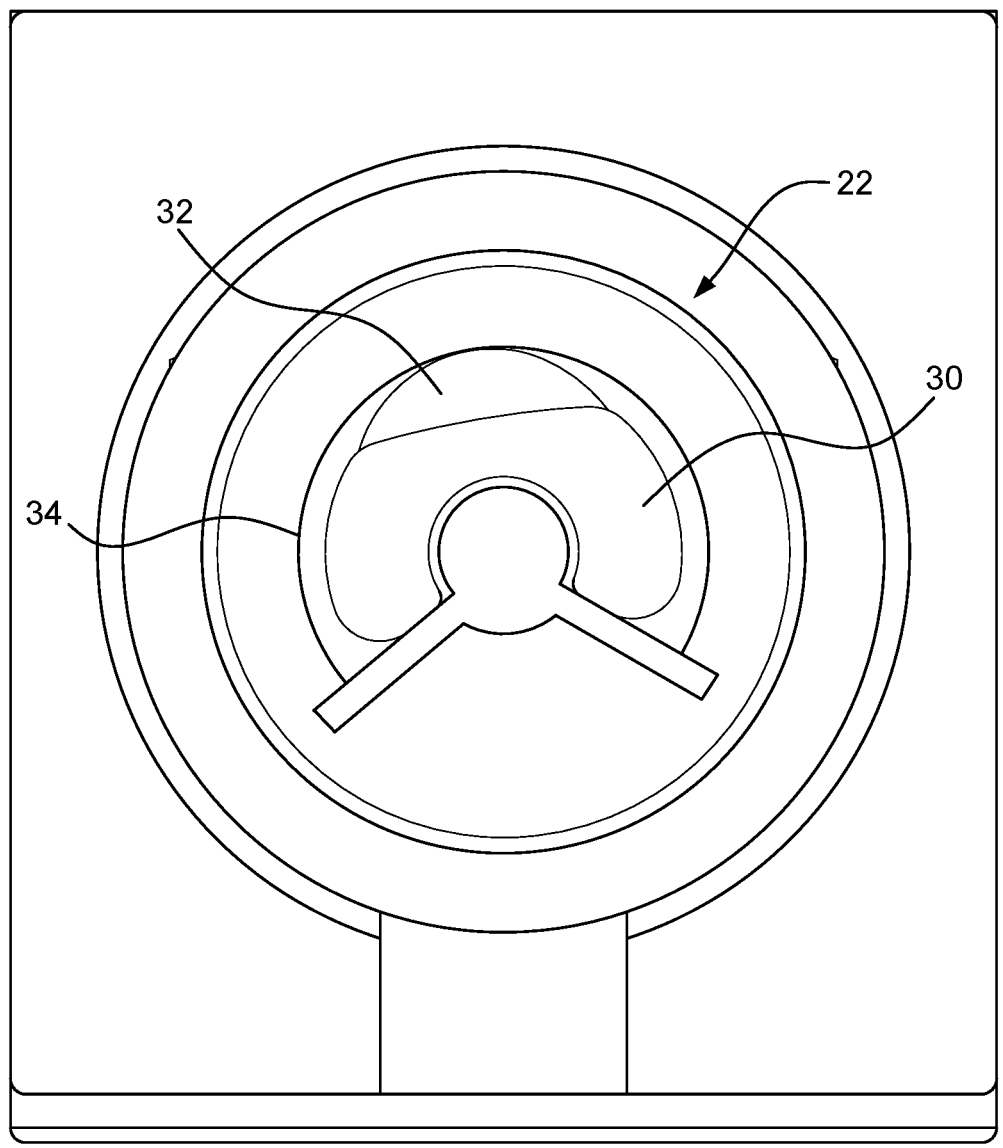
FIG. 3B is a plan view of a nozzle with a canted opening.

FIGS. 3A and 3B are plan views of the nozzle 22 with an exemplary nozzle opening downstream of the nozzle base 23. In the exemplary nozzle 22 shown in FIGS. 3A and 3B, the nozzle opening 30 is part-toroidal shaped and includes a block member 32 that cuts across the part-toroidal shape to obstruct water flow to a portion of the deflector plate 24. In some embodiments, the part-toroidal shape spans an arc less than 360 degrees, preferably between 240-270 degrees. In FIG. 3A, the nozzle opening 30 may also include angled block members 33 that control water distribution back toward the sprinkler prior to (i.e., upstream of) the distal end 14a of the center pivot pipe 14. The angled block members 33 are positioned at ends of the part-toroidal shaped opening 30.

With continued reference to FIGS. 3A and 3B, the part-toroidal shape of the nozzle opening 30 is defined by a part-circular perimeter 34, where the block member 32 is positioned across a segment of the part-circular perimeter 34. The block member 32 may not define a perfect segment for the part-circular perimeter 34, but for purposes of the present description, a "segment" of the part-circular perimeter may include a non-straight line across the part-circular perimeter 34. Additionally, the part-circular perimeter 34 may not be a perfect circle.

The block member 32 may be disposed on a distal end side of the nozzle opening 30. That is, in the orientation shown in FIGS. 3A and 3B, the pivot pipe of the center pivot irrigation system would be oriented from bottom to top in FIGS. 3A and 3B with the top of FIGS. 3A and 3B corresponding to a distal end of the pivot pipe. Additionally, in the embodiment shown in FIG. 3B, the part-toroidal shape is canted relative to a longitudinal axis of the pivot pipe to compensate for curvature in the deflector plate 24 and to also more precisely feather the edge of the pattern under the pivot pipe. In FIG. 3B, the part-toroidal shape is canted slightly counterclockwise. As shown in FIG. 3A, in other embodiments, the part-toroidal shape may not be canted.

The nozzle 22 is particularly configured to achieve the proposed wetted area 16 as shown in FIG. 1. Because the part-toroidal shape spans an arc less than 360 degrees, the pivot side (opposite from the distal end side) of the nozzle will obstruct water flow to the pivot side of the deflector plate 24. The block member 32 similarly blocks a portion of the distal end side to obstruct water flow to the distal end side of the deflector plate 24.

The shape of the part-toroidal opening resembles the proposed sprinkler wetted area 16 as shown in FIG. 1. By extending the wetted area 16 back toward the pivot end of the pivot pipe 14, the sprinkler 18 positioned at the distal end of the pivot pipe 14 can provide the desired overlap with the adjacent sprinklers.

The block member 32 provides for the flattened wetted area to control the outward reach of the water distribution.

Figure 4:
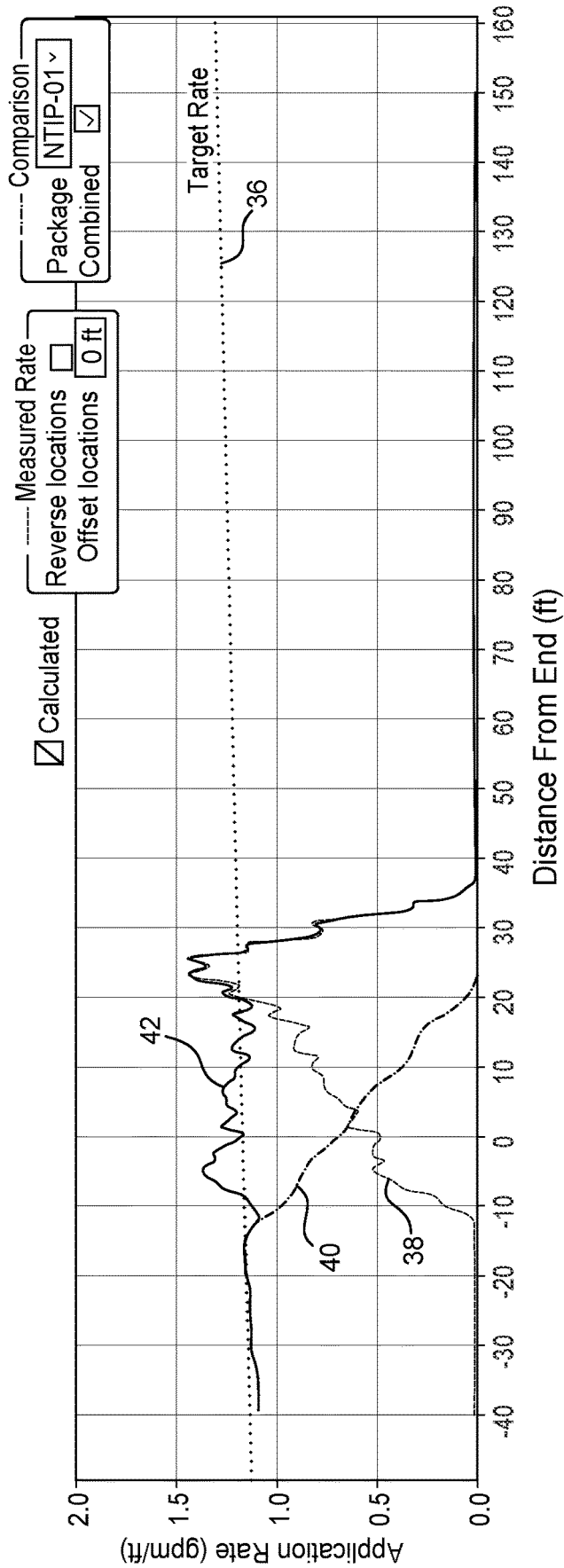
FIG. 4 shows test results of the nozzle and sprinkler according to the described embodiments.

FIG. 4 shows test results using the sprinkler nozzle of the described embodiments. The target rate line 36 represents the desired application rate of water distribution in gallons per minute per foot (gpm/ft). An objective is to reach the target rate along the pivot pipe 14 and past the pivot pipe 14 to about 30 feet. The dotted line 38 represents water distribution from the sprinkler 18 secured at a distal end of the pivot pipe including the sprinkler nozzle 22 of the described embodiments. The wavy line 40 represents the amount of water distributed by the sprinklers upstream of the pivot pipe distal end. In the test results shown in FIG. 4, water distribution in line 40 starts to fall about 10 feet from the pivot pipe distal end (at −10 on the chart).

The combined line 42 is the combination of water distribution from all the sprinklers including the distal end sprinkler 18 with the sprinkler nozzle 22 according to the described embodiments. The test results reflect the desired results with the water distribution remaining near the target rate line 36 to about 30 feet past the pivot pipe distal end.

Figure 5:
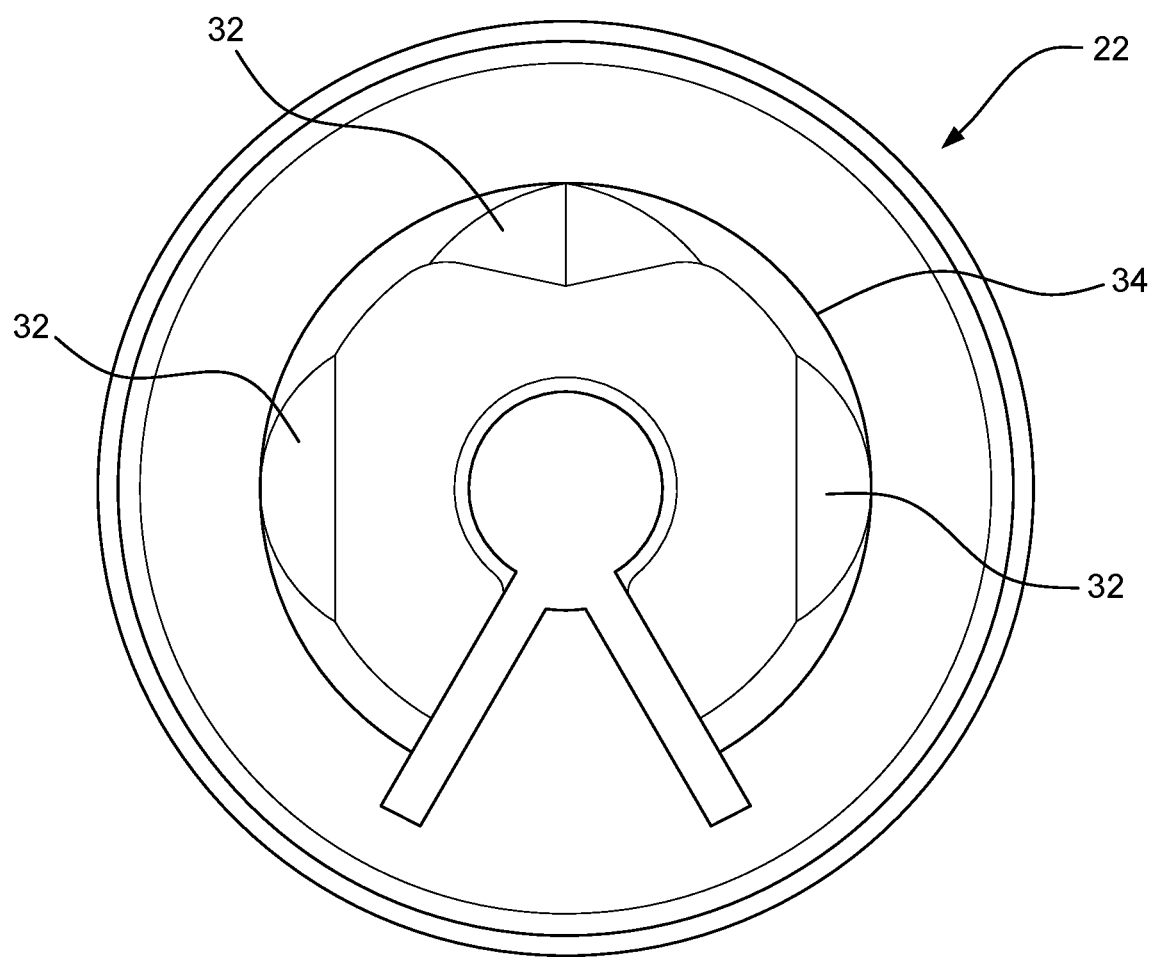
FIGS. 5 and 6 show alternative nozzles.

With reference to FIG. 5, the nozzle 22 may alternatively be provided with a plurality of block members 32 that cut across the part-toroidal shape. The block members 32 shown at 90 degrees and 270 degrees are positioned across segments of the part-circular perimeter 34, and the block member 32 at 180 degrees may be alternatively shaped to effect a desired water flow obstruction to the deflector plate 24.

Figure 6:
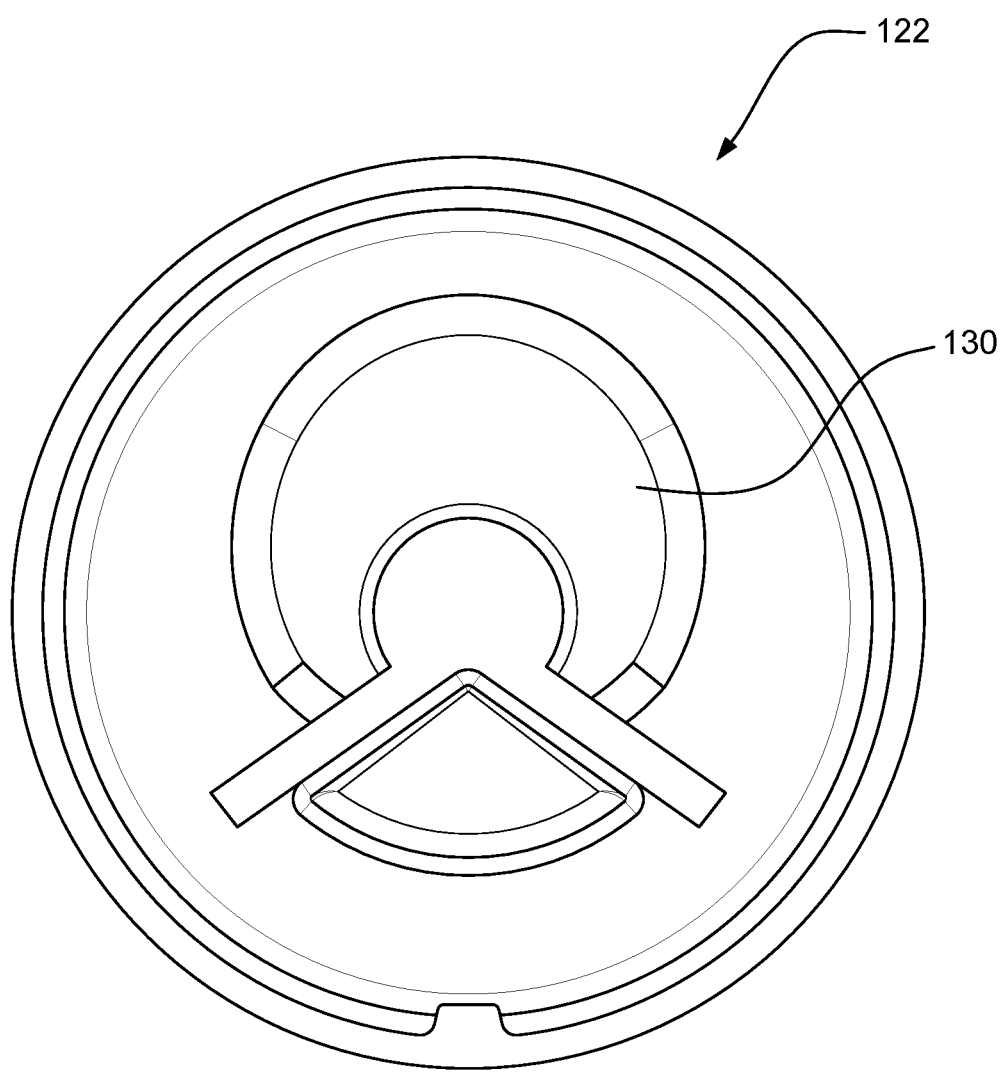

FIG. 6 shows yet another variation where the nozzle 122 includes an opening 130 with an oblong part-toroidal shape. That is, the part-toroidal shape is skewed to include a larger opening on the distal end side (i.e., in the 180-degree position). The nozzle 122 similarly creates a distribution pattern that complements the distribution pattern of the sprinklers along the pivot. In this embodiment, rather than truncating the pattern at 25-30 feet to match the distance of throw of the sprinklers along the pivot pipe, the nozzle 122 maximizes the distance the sprinkler throws while still irrigating the crop clear out to the end of the wetted area.

As shown in FIG. 6, the opening 130 in the nozzle 122 is extended toward the distal end side rather than truncating it, resulting in more water toward the distal end side of the sprinkler. That is, the oblong part-toroidal nozzle opening 130 is wider on the distal end side and narrower on the sides.

The sprinkler nozzle and sprinkler of the described embodiments provides for a custom designed water application to complement adjacent sprinklers on the pivot pipe. The nozzle may enable the sprinkler to distribute water back under the pivot pipe to supplement the deficit of water from sprinklers mounted along and near the end of the pivot pipe. The nozzle also applies water a distance beyond the end of the pivot in such a way as to match the application rate of the sprinklers along the pivot, thus effectively increasing the acres fully irrigated by the pivot.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sprinkler nozzle for a sprinkler positioned at a distal end of a center pivot irrigation system, the center pivot irrigation system including a pivot pipe rotatably coupled with a center pivot and a plurality of sprinklers mounted along the pivot pipe, the sprinkler nozzle being cooperable with a deflector plate of the sprinkler and comprising:
   a connection part securable to the sprinkler; and
   a nozzle opening downstream of the connection part, the nozzle opening defining an outer end of a flow path before impacting the deflector plate, wherein the nozzle opening through which water flows before impacting the deflector plate is part-toroidal shaped and partially blocked or skewed to control water flow to portions of the deflector plate according to a desired wetted area such that a width of the nozzle opening varies circumferentially and flow through the nozzle opening is thereby not uniform across the nozzle opening, and wherein the part-toroidal shaped opening spans an arc less than 360 degrees,
   wherein the partially blocked or skewed part-toroidal shape of the nozzle opening is defined by a closed center portion having a radius, and wherein at least a portion of a radial width of the nozzle opening is greater than the radius of the closed center portion.

2. A sprinkler nozzle according to claim 1, wherein the nozzle opening includes a block member that cuts across the part-toroidal shaped opening and obstructs water flow to a portion of the deflector plate.

3. A sprinkler nozzle according to claim 2, wherein the part-toroidal shaped opening includes a part-circular perimeter, and wherein the block member is positioned across a segment of the part-circular perimeter.

4. A sprinkler nozzle according to claim 3, wherein the block member is disposed on a distal end side of the nozzle opening.

5. A sprinkler nozzle according to claim 4, wherein the part-toroidal shaped opening is canted relative to a longitudinal axis of the pivot pipe.

6. A sprinkler nozzle according to claim 2, comprising a plurality of block members that cut across the part-toroidal shaped opening.

7. A sprinkler nozzle according to claim 6, wherein the part-toroidal shaped opening includes a part-circular perimeter, and wherein the block members are positioned across segments of the part-circular perimeter.

8. A sprinkler nozzle according to claim 6, wherein the plurality of block members comprise block members positioned at 90 degrees and 270 degrees relative to a longitudinal axis of the pivot pipe.

9. A sprinkler nozzle according to claim 1, wherein the part-toroidal shaped opening spans an arc between 240-270 degrees.

10. A sprinkler nozzle for a sprinkler positioned at a distal end of a center pivot irrigation system, the center pivot irrigation system including a pivot pipe rotatably coupled with a center pivot and a plurality of sprinklers mounted along the pivot pipe, the sprinkler nozzle being cooperable with a deflector plate of the sprinkler and comprising:
    a connection part securable to the sprinkler; and
    a nozzle opening downstream of the connection part, the nozzle opening defining an outer end of a flow path before impacting the deflector plate, wherein the nozzle opening through which water flows before impacting the deflector plate is part-toroidal shaped and partially blocked or skewed to control water flow to portions of the deflector plate according to a desired wetted area, and wherein the part-toroidal shaped opening spans an arc less than 360 degrees,
    wherein the part-toroidal shaped opening is skewed such that the nozzle opening is an oblong part-toroidal shape,
    wherein the skewed part-toroidal shape of the nozzle opening is defined by a closed center portion having a radius, and wherein at least a portion of a radial width of the nozzle opening is greater than the radius of the closed center portion.

11. A sprinkler nozzle according to claim 10, wherein the oblong part-toroidal shape includes a larger opening on a distal end side.

12. A sprinkler comprising:
    a main body connectable to a source of water under pressure;
    the sprinkler nozzle of claim 1 secured to the main body; and
    a deflector plate positioned facing the sprinkler nozzle downstream of the sprinkler nozzle.

13. A center pivot irrigation system comprising:
    a center pivot;
    a pivot pipe rotatably coupled with the center pivot; and
    a plurality of sprinklers installed along a length of the pivot pipe, wherein the sprinkler of claim 12 is positioned adjacent a distal end of the pivot pipe.

* * * * *